Dec. 16, 1958 H. C. ZEISLOFT ET AL 2,864,392
GOVERNOR RESET MECHANISM
Filed June 1, 1954 2 Sheets-Sheet 2

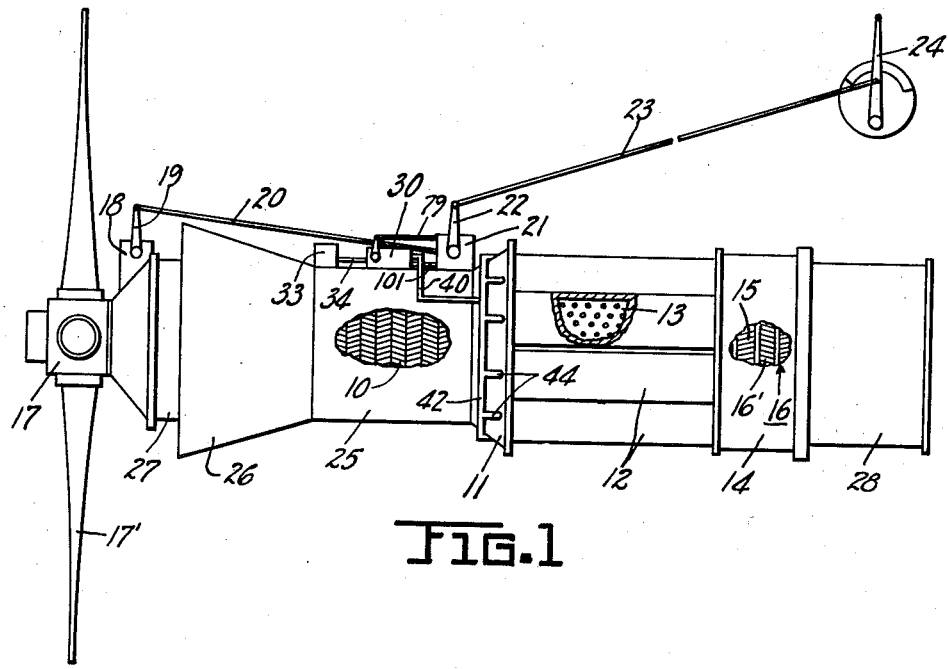
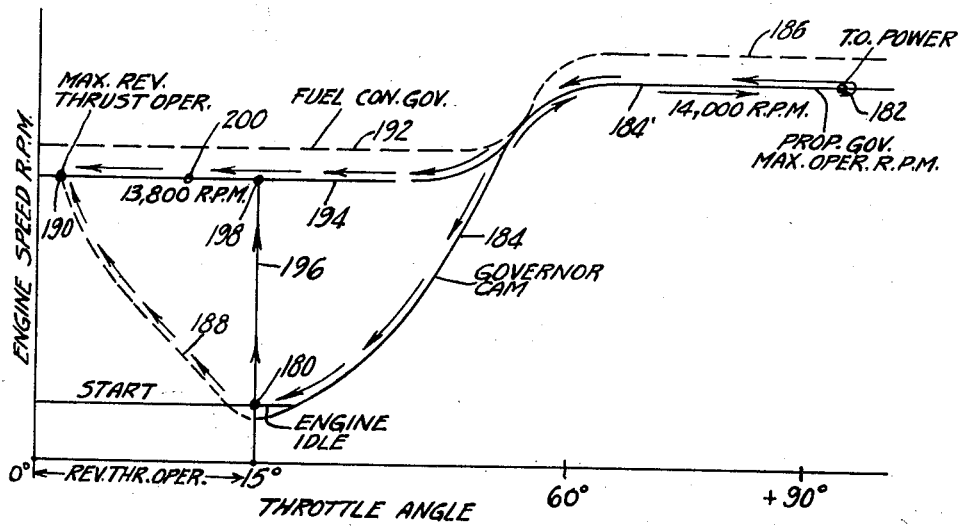

INVENTOR.
HARRY C. ZEISLOFT
HOWARD J. WILLIAMS
BY
J. C. Wiessler
ATTORNEY

United States Patent Office 2,864,392
Patented Dec. 16, 1958

2,864,392

GOVERNOR RESET MECHANISM

Harry C. Zeisloft, Rochester, N. Y., and Howard J. Williams, South Bend, Ind., assignors to Bendix Aviation Corporation, South Bend, Ind., a corporation of Delaware Application June 1, 1954, Serial No. 433,712

4 Claims. (Cl. 137—18)

This invention relates to governor mechanism for gas turbine engines for aircraft, and more particularly to a reset device for the governor mechanism.

It is a primary object of this invention to provide reset means for engine speed governors operable to reset or establish the governor speed setting for one or more predetermined conditions of engine operation.

Another object of this invention is to provide speed governing means for engines of the type specified operable to effect a transition from forward thrust operation to reverse thrust operation of the engine without decelerating the engine through a low or idle speed condition.

A further object of this invention is to provide automatically operable reset mechanism for engine speed governors which is adapted to reset the governor for reverse thrust operation of the engine in such a manner that the transition from any given condition of forward thrust operation to reverse thrust operation is effected in a more desirable manner than heretofore.

Additional objects and advantages of the invention will become apparent from the following description with reference to the accompanying drawings, wherein:

Figure 1 is a view in side elevation and partly broken away of a gas turbine propeller engine equipped with a fuel control device in accordance with the invention;

Figure 3 is an operational curve chart which compares the operation of applicant's improved fuel control device with that of devices heretofore used.

Figure 2:
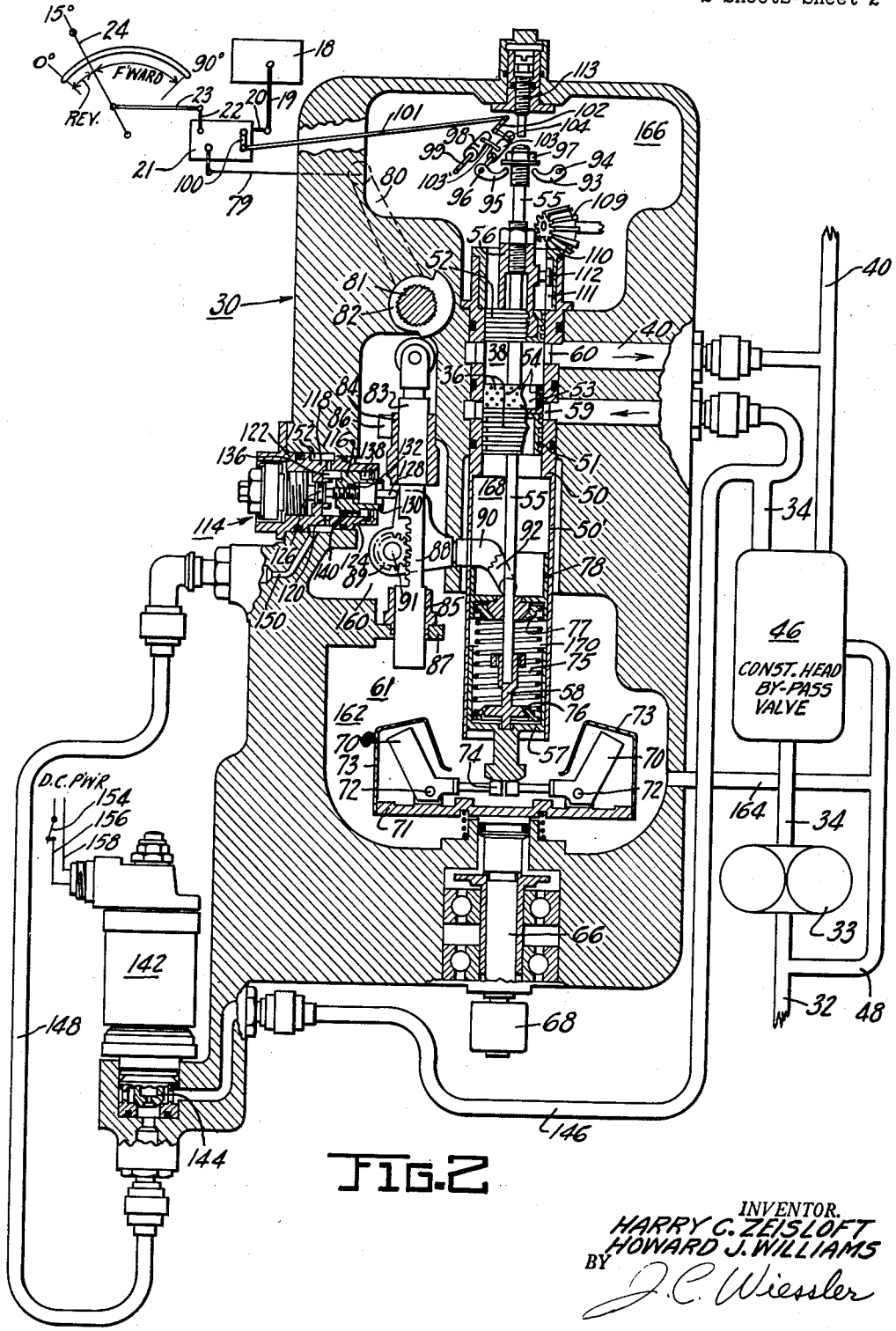
Figure 2 is a sectional schematic of the governor device which is the subject of this invention.

Referring now to Figure 1, the engine in general comprises a compressor 10 which forces air into an annular header 11 arranged to direct it to a plurality of annularly spaced combustion chambers 12, each containing a burner or generator tube 13 having air inlet holes in the walls thereof through which at least part of the air is fed for admixture with fuel to produce combustion. The burners 13 discharge into a collector ring 14 which is arranged to direct the air and products of combustion through a set of stationary distributing blades 15 against the blades 16' of a turbine rotor 16. The turbine 16 drives the air compressor 10, and these components may be mounted on a common shaft, not shown, or may be drivingly coupled through transmission mechanism. The turbine, in addition to driving the compressor, is adapted to drive a propeller 17, provided with variable pitch propeller blades 17'. The pitch changing mechanism may be of any suitable type, and includes a propeller governor 18 provided with a control lever 19, having connected thereto a link 20, which is shown as extending back to a coordinating box 21 housing suitable mechanism for coordinating the various engine controls under a single lever 22; the latter lever is connected to the pilot's control lever 24 by means of a link 23. The compressor 10 is mounted in a casing or housing 25, forwardly of which is a flared air intake or cowling 26. The section indicated at 27 houses reduction gearing between the turbine and propeller drive. As will be understood, the greater part of the available energy resulting from the combustion and expansion of the precompressor air and fuel is utilized in driving the turbine, compressor and propeller, whereas the remainder is utilized as jet thrust in a tail cone and exhaust jet nozzle housed in the tail piece 28.

The present invention is an improvement of the engine speed governor mechanism which is disclosed in the fuel system of the copending application of Harry C. Zeisloft, Serial No. 684,368, filed September 16, 1957, which is a continuation of Serial No. 248,402, filed September 26, 1951 (common assignee)) now abandoned. The said copending application is primarily concerned with the fuel supply system and coacting controls contained withing the here diagrammatically illustrated fuel control unit shown at numeral 30, a part of said control unit being an engine speed governor mechanism which is the subject of this application.

Referring now to Figures 1 and 2, fuel is supplied under pressure to a plurality of nozzles (not shown) in the combustion chambers 12 from a fuel source (not shown) through a conduit 32, a pressurizing pump 33, a conduit 34, a main metering and governor valve 36, a chamber 38, a metered fuel passage 40, a manifold 42, and a plurality of individual nozzle fuel lines 44. A constant meter- ing head by-pass valve means 46 is preferably of the type disclosed and claimed in the copending application of Harry C. Zeisloft, supra, and is herein shown located in conduit 34 for illustrative purposes; however, in practice said valve is preferably made part of control unit 30 as disclosed in the said copending application. The valve means 46 is continuously responsive to the pressure drop across governor valve 36 and automatically maintains said drop at a constant value irrespective of variations in metering or governor valve area by by-passing fuel from conduit 34 to a pump return passage 48, as required.

The governor valve 36 is mounted for reciprocable and rotational movement in an open ended cylindrical valve sleeve member 50 having a sleeve extension section 50', and comprises grooved valve guides 51 and 52, a hollow valve element 53 fixedly connected to land 51 and having a plurality of metering orifices 54 therein and a valve stem 55 connected to said members 51, 52 and 53, said valve stem being threadedly received near the upper end thereof by a valve connecting member 56 and being connected to a reciprocable cup-shaped spring guide member 57 by a link 58 at the lower end thereof. Sleeve member 50 contains a plurality of inlet ports 59 and outlet ports 60 which are adapted to connect inlet conduit 34 with metering orifices 54, and discharge conduit 40 with valve chamber 38, respectively.

An adjustable engine speed governor, generally indicated at 61, is adapted to control the metering position of valve 36 in a manner to be described, and includes a governor drive shaft 66 drivably connected to the engine by a spline 68 and to a pair of centrifugal weights 70 by means of a rotatable disc-shaped plate member 71 on which said weights are pivotally mounted at 72 and on which is peripherally mounted a centrifugal weight shroud element 73. During engine operation the force output of weights 70 is transmitted through foot members 74 and the spring guide 57 to a governor spring 75, said governor spring being held between spring retainer elements 76 and 77, said retainer 76 being at all times movable with link 58 and spring guide 57 and said retainer 77 being movable with an axially actuable governor setting member 78. The setting of governor spring 75 is normally dependent on the position of pilot's lever 24, which is connected to member 78 through the coordinating box 21 by linkage 22, 23, 79 and 80, a shaft 81 rotatable with lever 80, a governor scheduling cam 82 mounted on shaft 81, a cam follower rod 83 axially actuable in guide members 84 and 85 (which are mounted in portions 86 and 87 of the control housing), a rack section 88 of rod 83, and a gear 89 in mesh with rack 88 for positioning a governor reset lever 90 which is mounted on a shaft 91, said lever 90 having a bifurcated end 92 in continuous contact with a webbed section of the member 78.

In order to accelerate the engine, clockwise movement is imparted to the pilot's lever 24 in the forward thrust range of engine operation resulting in rotation of governor scheduling cam 82 which moves to a position of greater cam rise thereby actuating follower 83 downwardly and rotating gear 89 and reset lever 90 in a clockwise direction to compress governor spring 75, which actuates governor valve 36 downwardly or in an opening direction with stem 55 and moves weights 70 inwardly. The degree of opening movement of valve 36 is controlled by an acceleration control lever 93 rotatably mounted on a shaft 94, or by a part throttle control lever 95 similarly mounted on a shaft 96; either of said levers is adapted to limit the valve opening whenever a nut 97, which is mounted on the upper threaded end of stem 55, is actuated into contact therewith.

Acceleration lever 93 is actuated in a counterclockwise direction during an acceleration of the engine as a function of engine speed and compressor inlet temperature, by mechanism not shown, and part throttle lever 95 is independently positionable as a function of pilot's lever position, compressor inlet temperature and engine speed. The acceleration lever 93 may be controlled by a three dimensional cam, not shown, which is responsive to engine speed and compressor inlet temperature to limit fuel flow during an acceleration of the engine to, say, maximum speed such that maximum allowable turbine temperature is not exceeded and compressor surge or stall is avoided. The part throttle lever 95 is controlled by a separate three dimensional cam 98 mounted on a shaft 99, said cam being rotatable as a function of engine speed and axially actuable as a function of compressor inlet temperature for limiting fuel flow to the engine along a part throttle operating curve to some steady state condition of engine operation during normal forward thrust operation or during reverse thrust operation of the engine, depending on the position of pilot's lever 24. Pilot's lever 24 is connected to part throttle lever 95 by means of linkage 22, 23, coordinating box 21, lever 100, link 101, bell crank 102, and cam follower member 103 which has an extension 103' in continuous contact with cam 98, said member 103 being keyed to shaft 96 and axially movable thereon by bell crank 102 which engages a slot 104 in said member. The coordinating box 21 includes a cam which positions bell crank 102 as a function of pilot's lever setting, and as follower member 103 is moved axially by the bell crank, extension 103' follows the contour of cam 98 causing rotation of part throttle lever 95. The levers 93 and 95 are mutually overriding, so that that lever which limits the opening of valve 36 to the lesser area controls. Mechanism for controlling levers such as 93 and 95 as a function of engine speed and compressor inlet temperature is disclosed and claimed in the copending application of Harry C. Zeisloft, supra.

In addition, metering valve 36 may be rotated to vary the effective metering area by means of a gear 109 which meshes with a gear sector member 110 mounted for rotation within sleeve 50. A slotted section 111 is formed in the wall of member 110 and is adapted to engage a knob 112, which is connected to member 56, for rotating valve 36. Gear 109 may be rotated as a function of compressor discharge pressure by mechanism such as is disclosed and claimed in the copending application of Harry C. Zeisloft, supra.

Whenever an engine deceleration is initiated, valve 36 is actuated to a minimum flow position in an axial direction as determined by the adjusted position of a minimum flow stop 113.

A fuel governor reset device 114 comprises a reciprocable piston 116 slidable within a sleeve member 118 which contains a plurality of ports 120 and is mounted in a section 122 of the housing, said piston 116 being movable between an annular stop member 124 and an engine idle speed adjustment member 126 which is threadedly connected to the sleeve 118. A member 128 is positionally fixed within a cylindrical extension 130 of piston 116 and is adjustably connected to said piston by threaded extension 132; the screw head of extension 132 is shown in abutment with member 126, thereby establishing an idle speed setting of governor 61, by fixing the idle position of governor lever 90 which is shown abutting the end of member 128. Piston 116 forms fuel chambers 136 and 138 on either side thereof, said chambers being connected by a pressure relief passage 140 through said piston.

A solenoid valve unit 142 has a valve element 144 which when closed interrupts communication between a passage 146, which is connected to high pressure control inlet conduit 34, and a passage 148, which is connected to chamber 136 through a conduit 150, an annular chamber 152 and ports 120. The solenoid unit 142 is supplied with power from a source, not shown, whenever a pilot actuated switch 154 is closed to complete a circuit to the solenoid through lead lines 156 and 158. When valve 144 is closed the fuel pressure in chamber 136 equalizes with the pressure in chamber 138 through passage 140 in piston 116; said latter chamber is vented to pump inlet pressure through housing chambers 160 and 162, and a conduit 164. A housing chamber 166, a valve sleeve chamber 168 and a governor spring chamber 170 are also vented to pump inlet pressure through governor chamber 162 and conduit 164. Whenever solenoid 142 is deenergized valve 144 opens and high pressure fluid flows into chamber 136 which actuates piston 116 and member 128 rightwardly against annular stop 124, thereby bringing member 128 into abutment with governor lever 90 and actuating said lever in a clockwise direction. The latter action resets the governor to function at a new predetermined engine operating speed for a purpose to be described.

*Operation*

The fuel control mechanism illustrated in Figure 2 is shown substantially as it would appear if the engine were idling at point 180 of Figure 3. In this condition of engine operation, solenoid valve 144 is closed and member 128 of reset device 114 determines the fuel governor idle speed setting. When the engine is idling a condition of equilibrium is maintained between governor spring 75 and centrifugal weights 70 and the position of metering valve 36 is controlled to hold idle speed. Nut 97 is out of contact with both levers 93 and 95, and pilot's lever 24 is positioned at 15° of throttle angle which demands, via propeller governor setting cam means in coordinating box 21, not shown, and propeller governor 18, a minimum pitch setting of propeller 17, and which positions the fuel governor scheduling cam 82 out of controlling relation to follower 83, as shown, via a second cam, not shown, in coordinating box 21. Should the pilot now desire to accelerate the engine to the take-off power point 182, pilot's lever 24 is advanced to the 90° position which, through the aforementioned fuel governor speed setting cam in coordinating box 21, causes clockwise rotation of the governor scheduling cam 82 to a position of maximum cam rise along a curve such as illustrated at 184 and 186; this results in a resetting of the speed setting of fuel governor 61 ahead or in advance of the speed setting of the propeller governor 18, which latter speed setting is illustrated by constant speed curve 184', for overspeed protection of the engine. In other words, the propeller normally governs engine speed at take-off power point 182, and the fuel control governor offers overspeed protection in any emergency, as indicated by the engine speed difference between propeller governor curve 184' and fuel governor curve 186 at 90° throttle angle. The acceleration control lever and gear 93 and 109 control the rate of opening of metering valve 36 during an engine acceleration so that maximum allowable turbine temperature is not exceeded and compressor surge or stall is avoided; the part throttle lever 95 controls part throttle equilibrium positions of valve 36 whenever the fuel governor 61 is set by cam 82 or by reset device 114 to govern a higher than existing engine speed, which condition normally exists at higher than idle engine speeds when the propeller control speed. With an engine operating according to the mode illustrated in Figure 3, various equilibrium conditions of engine power output are selectable by the pilot along the constant maximum operating speed curve 184', as illustrated.

Frequently during taxiing operations of an aircraft, the pilot finds it necessary or desirable to reverse the thrust of an engine or engines for the purpose of braking the aircraft, reversing the direction of movement thereof, or for rotating the aircraft, as in turning operations. Heretofore in engines of the type above specified, it has been necessary to decelerate the engine from some selected power point of operation at maximum speed, for example, on the maximum operating speed curve to an engine idle speed condition, and then to re-accelerate to a point of reverse thrust power operation, such as is indicated by reverse thrust point 190 on curve 194 in Figure 3. Such a deceleration and subsequent re-acceleration to a reverse thrust power point could not be avoided because of the necessity of rotating the pilot's lever 24, for example, through the forward thrust speed range to an idle speed setting at 15°, and then to a selected reverse thrust power point between 15° and 0° throttle angle; in so doing, of course, fuel governor 61 was reset to govern at idle speed by cam 82, which necessitated a deceleration of the engine to idle speed before reverse thrust operation thereof could be demanded by the pilot.

Our invention enables a pilot to avoid the delays incident to first decelerating and then re-accelerating the engine by providing the governor reset device 114, which may be energized to select the engine speed indicated by curve 192 prior to an actual demand by the pilot at control lever 24 for reverse thrust operation. In other words, the reset device 114 may be energized during engine operation on constant maximum operating speed curve 184'. This mode of operation may be initiated by opening switch 154 while the engine is operating on the maximum speed curve 184'; opening the switch deenergizes solenoid 142 and opens valve 144, which allows high pressure fuel to flow from conduit 146 to chamber 136 through valve 144, conduit 148, passage 150 and ports 120. High pressure fuel in chamber 136 causes piston 116 to move rightwardly against stop 124, in which position the piston 116 and member 128 are adapted to establish a fuel governor speed setting along a reverse thrust constant overspeed protection curve 192. Following energization of device 114, the pilot may retard throttle lever 24 from, for example, a 90° position to a reverse thrust power position between 0 and 15° throttle angle; as the throttle 24 is retarded the governor cam 82 is rotated in a counterclockwise direction, but is ineffective below about a 50° throttle angle to control the setting of governor spring 75, which is set by device 114 during energization thereof to control engine speed along curve 192. Movement of lever 24 into the reverse thrust range also effects, by means of mechanism in coordinating box 21 and propeller governor 18, a reversal in the pitch of propeller 17 to control reverse engine power output along the constant speed curve 194 between 0° and 15° throttle angle; at the same time part throttle lever 95 is reset to control fuel flow at selected reverse thrust power points along speed curve 194.

From the above it is apparent that during normal reverse thrust engine operation, the propeller and governor 17 and 18, and the part throttle lever combine to control engine speed and fuel flow, respectively, along curve 194.

If, for any reason, the propeller governor should fail to function properly to control engine speed, fuel governor 61, as set by device 114, will function to control engine speed and fuel flow along curve 192.

If the pilot should demand reverse thrust operation from a condition of engine idle, device 114 is first energized to reset governor 61 to reverse thrust overspeed protection curve 192, whereby the engine accelerates along a curve 196 to a point 198 on speed curve 194, following which pilot's lever 24 may be actuated to a reverse thrust power position to reset the propeller blade angle and part throttle lever 95 for reverse thrust power control at any point, such as point 200, along speed curve 194.

Although only one embodiment of the invention has been illustrated and described it will be apparent to persons skilled in the art that various changes in form and relative arrangement of parts may be made to suit requirements.

We claim:

1. In a fuel feed and power control system for a turboprop engine having a burner, the combination of a fuel conduit for conducting fuel to said burner, a fuel control valve in said conduit for controlling the fuel flow through said conduit to said burner, engine speed governor means having an adjustable speed setting and being operatively connected to said valve for controlling the fuel flow to said burner, pilot operated control means operatively connected to said governor means for adjusting the speed setting of said governor means in a predetermined manner, said control means including a governor setting lever operatively connected to said governor means and a governor scheduling cam for controlling said lever, and governor reset means operable independently of said control means for controlling the speed setting of said governor means at preselected positions of said control means and below a predetermined maximum speed setting of said governor means, with said governor reset means including fluid pressure responsive movable wall means adapted to be connected to said governor means through said governor setting lever.

2. In a fuel control system for a pilot operated turboprop engine having a burner, the combination of a fuel conduit for conducting fuel to said burner, a fuel control valve in said conduit for controlling the fuel flow to said burner, engine speed responsive governor means having an adjustable speed setting and being operatively connected to said valve for controlling the fuel flow to said burner as a function of engine speed, with said governor means including engine speed responsive control means for generating a first force which varies as a function of engine speed and control spring means having an adjustable speed setting for providing a second force opposing said generated first force, pilot operated first control means operatively connected to said governor means for adjusting the speed setting of said control spring means to select a first speed at which said governor means is operative to control the engine speed, and pilot operated second control means operatively connected to said governor means in an overriding arrangement relative to said pilot operated first control means, with said second means including fluid pressure responsive means connected to adjust the speed setting of said control spring means to select a second speed at which said governor means is operative to control the engine speed, and electrically actuated means for controlling the operation of said fluid pressure responsive means.

3. In a fuel feed and power control system for a pilot operated gas turbine engine having a burner, the combination of a fuel conduit for conducting fuel to said burner, a fuel control valve in said conduit for controlling the fuel flow through said conduit to said burner, engine speed responsive governor means having an adjustable speed setting and being connected to said valve for controlling the fuel flow through said conduit as an inverse function of engine speed, first pilot operated means for selectively adjusting the speed setting of said governor means and second pilot operated means for selectively adjusting the speed setting of said governor means independently of said speed setting adjustment by said first pilot operated means including fluid pressure responsive movable wall means operatively connected to said governor means, and control means for energizing said movable wall means to adjust the speed setting of said governor means, with said governor means including control spring means for determining the speed setting and being adjustable by either one of said first and second pilot operated means to select an operating speed for said engine.

4. In a fuel feed and power control system for a pilot operated gas turbine engine having a burner, the combination of a fuel conduit for conducting fuel to said burner, a fuel control valve in said conduit for controlling the fuel flow through said conduit to said burner, engine speed responsive governor means having an adjustable speed setting and being connected to said valve for controlling the fuel flow through said conduit as an inverse function of engine speed, first pilot operated means for selectively adjusting the speed setting of said governor means, and second pilot operated means for selectively adjusting the speed setting of said governor means independently of said speed setting adjustment by said first pilot operated means including fluid pressure responsive means operatively connected to said governor means, and electrically actuated means for controlling said fluid pressure responsive means to adjust the speed setting of said governor means, with said governor means including control spring means for determining said speed setting and being adjustable by either one of said first and second pilot operated means to select an operating speed for said engine.

References Cited in the file of this patent

UNITED STATES PATENTS

| | | |
|---|---|---|
| 2,197,554 | Lawrence | Apr. 16, 1940 |
| 2,593,536 | Chamberlin et al. | Apr. 22, 1952 |
| 2,616,507 | Greenland | Nov. 4, 1952 |
| 2,616,508 | Mock | Nov. 4, 1952 |
| 2,638,992 | Lundquist et al. | May 19, 1953 |
| 2,640,550 | Knapp et al. | June 2, 1953 |
| 2,664,959 | Stuart | Jan. 5, 1954 |
| 2,667,935 | Woodward | Feb. 2, 1954 |
| 2,679,297 | Eastman et al. | May 25, 1954 |

FOREIGN PATENTS

| | | |
|---|---|---|
| 161,922 | Switzerland | Aug. 1, 1933 |